(12) United States Patent
Salgado et al.

(10) Patent No.: US 8,429,417 B2
(45) Date of Patent: Apr. 23, 2013

(54) PROTECTION AGAINST SIDE CHANNEL ATTACKS WITH AN INTEGRITY CHECK

(75) Inventors: Stephanie Salgado, Meudon (FR); David Vigilant, Meudon (FR); Guillaume Fumaroli, Meudon (FR)

(73) Assignee: Gemalto SA, Meudon (FR)

( * ) Notice: Subject to any disclaimer, the term of this patent is extended or adjusted under 35 U.S.C. 154(b) by 603 days.

(21) Appl. No.: 12/444,885

(22) PCT Filed: Oct. 3, 2007

(86) PCT No.: PCT/IB2007/002931
§ 371 (c)(1),
(2), (4) Date: Apr. 9, 2009

(87) PCT Pub. No.: WO2008/044113
PCT Pub. Date: Apr. 17, 2008

(65) Prior Publication Data
US 2010/0077225 A1    Mar. 25, 2010

(30) Foreign Application Priority Data
Oct. 9, 2006 (EP) ..................................... 06291567

(51) Int. Cl.
*G06F 21/00* (2006.01)
(52) U.S. Cl.
USPC ............ 713/187; 714/799; 714/807; 713/189

(58) Field of Classification Search .................. 713/187; 714/E11.04
See application file for complete search history.

(56) References Cited

U.S. PATENT DOCUMENTS

| 4,881,263 | A | * | 11/1989 | Herbison et al. .............. 713/162 |
| 5,442,645 | A | * | 8/1995 | Ugon et al. .................... 714/736 |
| 5,559,884 | A | * | 9/1996 | Davidson et al. ............. 713/187 |
| 5,754,564 | A | * | 5/1998 | Francis ........................ 714/752 |
| 6,961,893 | B1 | * | 11/2005 | Mukund et al. ............... 714/781 |
| 2002/0169971 | A1 | * | 11/2002 | Asano et al. .................... 713/193 |
| 2003/0023872 | A1 | * | 1/2003 | Chen et al. ..................... 713/200 |
| 2004/0261001 | A1 | | 12/2004 | Chang et al. |

FOREIGN PATENT DOCUMENTS

EP  0402210 A1  12/1990

* cited by examiner

*Primary Examiner* — Jung Kim
*Assistant Examiner* — Ngoc D Nguyen
(74) *Attorney, Agent, or Firm* — The Jansson Firm; Pehr B. Jansson

(57) ABSTRACT

The invention relates to a method for protecting a sensitive operation by checking the integrity of at least a subset of the data manipulated by the sensitive operation. Data to be checked are divided into blocks, an intermediate integrity check value being computed for each block, the intermediate integrity check values being computed in random order. The invention also relates to a cryptographic device wherein at least one sensitive operation of the cryptographic device is protected by a method according to the invention.

11 Claims, 1 Drawing Sheet

```
r = 0
n = 1+floor((L-1)*k/t)
for I = 0 to N*L-1
    i = sigma(I) mod L
    r₁ = CRC(B_{i,floor(sigma(I)/L)})
    for p = 2 to n
        r_p = CRC(r_{p-1})
    si = i*k mod t
    rr = r_{1+floor(i*k/t)}
    r = r XOR CRC(hi_{t,si}(rr)) XOR ((lo_{t,t-si}(rr))<<si)
return r
```

```
r = 0
n = 1+floor((L-1)*k/t)
for I = 0 to N*L-1
    i = sigma(I) mod L
    r_1 = CRC(B_{i,floor(sigma(I)/L)})
    for p = 2 to n
        r_p = CRC(r_{p-1})
    si = i*k mod t
    rr = r_{1+floor(i*k/t)}
    r = r XOR CRC(hi_{t,si}(rr)) XOR ((lo_{t,t-si}(rr))<<si)
return r
```

PROTECTION AGAINST SIDE CHANNEL ATTACKS WITH AN INTEGRITY CHECK

BACKGROUND OF THE INVENTION

1. Field of the Invention

The invention relates to a method for protecting the execution of sensitive operations against attacks such as side channel attacks. The invention also relates to a cryptographic device, in particular a smart card, implementing such a method.

2. Description of the Related Art

A sensitive operation is defined as an operation which manipulates sensitive data. Sensitive data is defined as data which should only be accessible by legitimate entities which need such sensitive data in order to perform their duties. Typically, special access controls are in place for sensitive data, in order to guarantee that no sensitive data is leaked to unauthorized entities.

Examples of sensitive operations comprise encryption operations taking place inside a cryptographic device, the encryption operation requiring access to a key which is typically securely stored inside the cryptographic device.

As known in the art, cryptographic devices are devices implementing cryptographic mechanisms, such as hashing mechanisms. Examples of cryptographic devices include smart cards, USB keys, dongles, Personal Digital Assistants (a.k.a PDAs), mobile phones, personal computers (a.k.a PCs), etc. Typically, such cryptographic devices may be used for securing a user's electronic transactions. The expression "electronic transaction" is to be taken in its broadest meaning. I.E. it is not limited to financial transaction but also covers any Internet transaction, any transaction occurring through a telecommunication network etc. Securing electronic transactions may comprise the cryptographic mechanisms of digitally signing electronic documents, decrypting electronic documents, negotiating session keys with a third party and/or authenticating a user. The above four cryptographic mechanisms are well known in the art. They are not limitative (other cryptographic mechanisms exist), and not mandatory (for example a cryptographic device does not necessarily embed a digital signature mechanism).

Cryptographic mechanisms have an input and an output. For example, an encryption mechanism may have an input consisting of a plaintext and an output consisting of a ciphertext. When first cryptographic devices were designed, many people were thinking that the only attacks possible on their cryptographic mechanisms consisted in attacking the input and output with cryptanalysis. However, it turned out that cryptographic devices are also susceptible to so-called "side channel attacks". A side channel attack is any attack based on information gained from the physical implementation of a cryptosystem, rather than theoretical weaknesses in the algorithms (as opposed to cryptanalysis). Side channel attacks rely on the fact that a cryptographic device has inputs and outputs means other than the legitimate input and output means. For example use of illegitimate input means (often referred to as fault injection attacks) may comprise altering cryptographic operations by heating the cryptographic device, by modifying its clock (e.g. speeding up above the recommended limit), by putting it under UV light, X-Ray, or ultrasonic waves, by shaking it or otherwise mechanically acting on it, etc. Such alteration can be carefully designed (for example a glitch can be introduced at the exact moment that a counter is about to be decremented) or can be random (for example the aim might simply be to induce a random fault and analyze the consequence of the fault, which may leak sensitive information). Use of illegitimate output means may comprise analyzing the power consumption of the cryptographic device (indeed, an electronic component requires more electric power to perform a complex operation such as "square and multiply" than it does for a simple operation such as "square only"), analyzing the electromagnetic field created by the cryptographic device, analyzing the sounds emitted by the cryptographic device, etc. Well-known side channel attacks include Simple Power Analysis (SPA), Differential Power Analysis (DPA) or Differential Fault Analysis (DFA).

Periodically checking the integrity of important data manipulated during a sensitive operation, such as keys used inside a cryptographic device during cryptographic computations, can help circumvent so-called fault injection attacks. Indeed, if a fault is generated, it may be detected (thanks to the integrity check), and appropriate actions may then be taken. Examples of integrity checks include fast error detection codes such CRC. CRC stands for Cyclic Redundancy Code. A CRC hardware module is available in many microcontrollers, which makes it a convenient tool for integrity checking in many electronic devices since it's very fast.

Unfortunately, when checking the integrity of data manipulated during a sensitive operation using the above method, some information is typically leaked. For example, an attacker may analyze a cryptographic device while it performs integrity checks for a sensitive operation, by using one of the above mentioned side-channel attacks, and recover some sensitive data.

Therefore, the method makes it more difficult to perform a fault injection attack but facilitates other side channel attacks such as SPA or DPA.

SUMMARY OF THE INVENTION

It is an object of the invention to propose a new method which makes it more difficult to tamper with the sensitive data (e.g. fault injection attacks) without significantly facilitating the spying of manipulated data (e.g. DPA, etc.).

The invention relates to a method for protecting a sensitive operation by checking the integrity of at least a subset of the data manipulated during the sensitive operation. For the sake of clarity, the at least subset of the data manipulated during the sensitive operation is referred to as "the data to be checked". Checking the integrity comprises computing an integrity check value from data to be checked, and comparing said integrity check value with a reference value. The reference value may be stored with the data to be checked (for example, the CRC of a key can be stored with the key), or can be communicated by other means.

According to the invention, the method consists in dividing data to be checked into blocks, an intermediate integrity check value being computed for each block, the intermediate integrity check values being computed in random order.

The random order is advantageous, since it makes it difficult for a hacker to guess the value of the data to be checked. Indeed, even if the hacker were to reconstruct the individual blocks, he would still need to figure out how to sort them in order to reconstruct the data to be checked. Of course, at the end of the integrity check computation, when all blocks have been processed, the final integrity check value is compared with the reference value in order to verify that the data to be checked have not been tampered with.

The integrity check may be conducted several times during the sensitive operation, in particular if the data to be checked are accessed several times during the sensitive operation. The integrity check may happen at randomly selected times, or at well defined breakpoints (which in general simplifies the implementation but in some instances may be a bit weaker, i.e. less resistant to attacks). For example, a breakpoint may be set just before data to be checked are accessed.

According to a preferred embodiment, the data to be checked are converted into at least two random parts, the integrity check being computed on the random parts instead of being computed on the data to be checked. Each random part is therefore divided into blocks, and all blocks of all random parts are checked in random order (e.g. the intermediate integrity value of the $5^{th}$ block of the $2^{nd}$ random part may be computed after the intermediate integrity value of the $11^{th}$ block of the $4^{th}$ random part). This is advantageous, as any block of any random part manipulated at any point in time is statistically independent of the actual sensitive data. This makes it even more difficult for a potential attacker to recover the data which integrity is being checked. The more blocks and the more random parts, the harder it is to perform a higher order analysis attack. The complexity of the analysis would essentially grow exponentially with the number of blocks. The more random parts are used, the less blocks per random part are needed, and conversely (provided the size of the blocks is sufficient). Obviously, this division in blocks is particularly suitable when there is a significant amount of data which integrity has to be checked.

For example, let's consider that data to be checked consist of a 56-bit DES key, and that a reference value associated with this key is stored with this key. This reference value (e.g. a CRC) is typically computed at the time the key is generated or loaded. According to the invention, the key can be XORed with a 56-bit random value in order to produce a first random part, the second random part being the 56-bit random value. It should be noted that data to be checked could have been converted into more than two random parts. For example n random parts could have been used, the random parts being as follows: $\{Rand_1, Rand_2, \ldots Rand_{n-1}, data\ XOR\ Rand_1\ XOR\ Rand_2\ XOR\ \ldots\ XOR\ Rand_{n-1}\}$.

Each random part can then be divided in seven 8-bit blocks. The integrity checking can then be performed by processing the 14 blocks (7 blocks for each random part) in random order, which limits the sensitive data leakage, since each block is random, and since the order of the blocks is unknown to the potential attackers. Then the integrity check value resulting from the above mentioned integrity checking (in a manner described more in details further below) can be compared with the reference value. If the two values are different, then most likely a fault injection in the DES key has occurred. Other reasons may include hardware failure, software bugs, etc., but in all instances appropriate actions should be taken (normally, whatever the reason, the difference should be treated as resulting from a potential attack in order to avoid any security breach).

Another example consists in protecting an RSA signature against Bell-Core attack. Thanks to the invention, the integrity checking improves the protection against fault injection and reduces leakage of information about secret keys. A Bell-Core attack consists, in a first step, in performing an RSA signature of a message and retrieving the result. In a second step, a Bell-Core attack performs the signature of the same message but injects a fault in one of both factors of the public modulus during the signature computation. The second step is repeated as many times as necessary, by injecting faults wherever needed. Thus it is possible to analyze the impact of the fault injections on the output of the signature, and to retrieve the factor based on this analysis. According to the invention, a logical countermeasure consists in checking the integrity of the RSA private keys each time they appear in computations. For example, the RSA private key may be stored with its reference value. Each time the RSA private key is used during the signature, the integrity check value is recomputed and compared with the stored reference value. If the values are different, the attack is detected. Moreover, with this invention, we ensure there is no information leakage about RSA private keys during the successive verifications of integrity. In other words, the fact that the integrity of the key is checked by the method according to the invention does not leak information about the key (such information could have been used by a DPA attack in order to retrieve the key). In addition, this technique is better than state of the art techniques consisting in verifying that the signature is valid before outputting it, because the signature verification requires either the RSA public key associated with the RSA private key to be stored (which is very inconvenient as a protocol must be put in place to this end), or an assumption to be made on the value of the public exponent (in which case the verification fails if the public exponent is not equal to the assumed value, such as the value $10001 typically used for RSA 1024).

BRIEF DESCRIPTION OF THE DRAWINGS

The invention and its advantages will be explained more in details in the following specification referring to the appended drawings, in which FIG. 1 represents a preferred integrity check mechanism well suited for the protection of a sensitive operation.

DETAILED DESCRIPTION OF THE INVENTION

According to a preferred embodiment of the invention, a method for protecting a sensitive operation by checking the integrity of at least a subset of the data manipulated by the sensitive operation ("data to be checked"), wherein checking the integrity comprises computing an integrity check value from data to be checked, and comparing said integrity check value with a reference value, has the following characteristics. Data to be checked are divided into blocks, an intermediate integrity check value being computed for each block, the intermediate integrity check values being computed in random order. Data to be checked are converted into at least two random parts, the integrity check being computed on the random parts (divided into blocks) instead of the data to be checked. Computing the integrity check value is preferably based on a CRC.

CRC algorithms are not the only types of integrity check algorithms adapted to the invention. Other types of integrity checks are possible, as long as they satisfy the above requirements, i.e. as long as they can be computed based on random parts derived from the data to be checked, the random parts being divided in blocks that are processed in random order, without altering the integrity check value. Many integrity check algorithms can be adapted to the invention. For example, it is possible to use an XOR integrity check, which is also advantageous in that it is faster than CRC and typically does not need specific hardware acceleration. However, basic XOR integrity checks (consisting in dividing data to be checked in blocks and XORing all blocks together) are a bit weak in the sense that two errors (or two attacks) at the same bit position in two arbitrarily selected blocks may cancel each other and remain unnoticed. A CRC integrity check, although not very strong cryptographically, is stronger than basic XOR while still reasonably fast. CRC integrity checks therefore represent a good performance/weakness trade-off.

A CRC (Cyclic Redundancy Code) of length n and dimension k is defined as a set C of polynomials of degree at most n over GF(2), the set C being associated with a polynomial g(x) of degree n-k over GF(2), g(x) being called the generator polynomial, the set C being such that for every polynomial c(x) of degree at most n over GF(2), c(x) belong to C if and only if g(x) divides c(x).

Polynomials c(x) belonging to C are also known as codewords c(x), and can be expressed in the form $c(x)=x^{n-k}m(x)+r(x)$.

The expression "the CRC of a message m(x)" is commonly used to refer to the polynomial r(x), which is the remainder of the division of $x^{n-k}m(x)$ by g(x).

Numerous versions of CRC exist, depending in particular on the polynomial g(x) which has been chosen and on the length n and dimension k. The following are well known examples of CRCs:

CRC-1 (probably the simplest one, also known as parity bit), CRC-5-CCITT (ITU G.704 standard), CRC-5-USB (used in particular for USB token packets), CRC-7 (used in certain telecom systems); CRC-8-ATM (used in ATM HEC), CRC-8-CCITT (used in 1-Wire bus), CRC-8, CRC-10, CRC-12 (used in telecom systems), CRC-16-Fletcher (used in Adler-32 A & B CRCs), CRC-16-CCITT (X25, V.41, Bluetooth, PPP, IrDA), CRC-16-IBM, CRC-16-BBS (XMODEM protocol), CRC-32-Adler, CRC-32-MPEG2, CRC-32-IEEE 802.3, CRC-32C (Castagnoli), CRC-64-ISO (used in ISO 3309), CRC-64-ECMA-182, CRC-128 (IEEE-ITU Standard, typically superseded by hashes such as MD5 & SHA-1), or CRC-160 (same comments as CRC-128).

Some CRC algorithms differ slightly from the above mathematical definition, in that they set a parameter, commonly referred to as the initial value (IV) of the CRC, to a non-zero value. The IV corresponds to the initial value of the shift register, the shift register being a register used in most implementations of CRC algorithms, as known in the art.

Unless otherwise stated, the IV is equal to zero, since this is required in order to fulfill the mathematical definition stated above. If the IV has been set to a different value, some properties of the CRC are affected. In particular the CRC of zero is no longer equal to zero. This may be useful in certain applications (for example, it may be desired that two files differing only by a number of leading zero bits nonetheless have a different CRC).

However, non-zero IVs are inconvenient in the context of the invention. Indeed, the invention makes use of the mathematical properties of the integrity check in order that it can be computed in random order on random blocks without affecting the final integrity check value. Therefore, a small adaptation is needed in case a CRC algorithm with non-zero IV is used, as may be the case when a hardware accelerator (or software library) implementing such special CRC is available, and no regular CRC (with IV=0) is available.

According to the invention, in case a CRC with non-zero IV is used, a pre-computation may be performed in order to allow recovering a CRC (with IV=$IV_0$ of a given piece of data M from a function of $IV_0$ and of the CRC (with IV=$IV_1$) of the same piece of data M. This method works for any IV, in particular $IV_0$ equal to zero. Let CRC(M,$IV_0$) be the CRC of M with initial value $IV_0$.

It can be shown that CRC(M,$IV_0$)=CRC(M XOR $K_1$, $IV_1$) XOR $K_2$. The values of the first and second constants $K_1$ and $K_2$ depend solely on the size of M, on the size of the CRC register, on $IV_0$ and on $IV_1$. Those four parameters typically do not depend on the actual value of data being manipulated which is why we use the term "constant". XOR operations (especially XOR with constants) being very fast, the method does not affect the performance too much.

To be more accurate, if a message M has a size I (in bits) greater than or equal to t, t being the output size (in bits) of the CRC (which is typically the size of the shift register), then the applicant has found that it is possible to demonstrate that:

$$CRC(M,IV_0)=CRC(M\ XOR\ ((expand_{t,I}(IV_0\ XOR\ IV_1))<<_I(I-t)),IV_1)$$

Where:
the $expand_{t,I}$ function transforms a t-bit register into a I-bit register (I being greater than or equal to t) by padding the t-bit register with I-t leading bits equal to zero. In other words, the $expand_{t,I}$ function adds some most significant bits, which do not change the value stored in the register but simply make the register larger: $expand_{t,I}(X_{t-1}, X_{t-2}, \ldots, X_0) = 0_{I-1}, 0_{I-2}, \ldots 0_t, X_{t-1}, X_{t-2}, \ldots, X_0$. The use of the $expand_{t,I}$ function is implicit and could have been omitted, but is indicated here for improved clarity;

the operator $<<_I$ is the shift left operator for I-bit registers (the length I is specified for improved clarity, although it is implicit), defined as follows. If the binary representation of X is $X_{I-1}, X_{I-2} \ldots X_0$, then the binary representation of X<<I-t is $X_{t-1}, X_{t-2}, \ldots X_0, 0_{I-t-1}, 0_{I-t-2}, \ldots 0_0$.

If I is smaller than t, then the applicant has found that it is possible to demonstrate that:

$$CRC(M,IV_0)=[CRC(M\ XOR\ shrink_{t,I}(hi_{t,I}(IV_0\ XOR\ IV_1)),IV_1)]$$

$$XOR[lo_{t,I}(IV_0\ XOR\ IV_1))]$$

$$XOR[(IV_0\ XOR\ IV_1)]$$

Where:
the $shrink_{t,I}$ function transforms a t-bit register into a I-bit register (I being smaller than t) by removing the t-I most significant bits. If some of the t-I most significant bits were non-zero, then they are lost: $shrink_{t,I}(X_{t-1}, X_{t-2}, \ldots, X_0)$ is equal to $X_{I-1}, X_{I-2}, \ldots, X_0$. But here the I-t most significant bits are zero by construction;

$hi_{t,I}(X)$ is defined for numbers X represented as a t-bit register. $hi_{t,I}(X)$ is equal to the number which binary representation consists of the I most significant bits of X. In other words, if the binary representation of X is $X_{t-1}, X_{t-2} \ldots X_0$ where each $X_i$ is a bit, $hi_{t,I}(X)$ is equal to the number which binary representation in a t-bit register is $0_{t-I-1}, 0_{t-I-2}, \ldots 0_0, X_{t-1}, X_{t-2}, \ldots X_{t-I}$;

$lo_{t,I}(X)$ is defined for numbers X represented as a t-bit register. $lo_{t,I}(X)$ is equal to the number which binary representation consists of the I least significant bits of X. In other words, if the binary representation of X is $X_{t-1}, X_{t-2} \ldots X_0$ where each $X_i$ is a bit, $lo_{t,I}(X)$ is equal to the number which binary representation in a t-bit register is $0_{t-1}, 0_{t-2}, \ldots 0_I, X_{I-1}, X_{I-2}, \ldots X_0$)

Possible uses of the above formulae are explained below:

In order for a cryptographic device to compute the CRC of M with IV=$IV_0$ (in our case $IV_0$=0) while the cryptographic device only comprises hardware or software computing the CRC of M with IV=$IV_1$, other than by re-implementing a CRC methods, one may XOR M with a first constant $K_1$, and use the device or software to compute the CRC on M XOR $K_1$. If the second formula above is needed (CRC computed on data shorter than the CRC register), an additional step has to be performed, during which the result of the CRC provided by the device or software is XORed with a second constant $K_2$ (in the first formula $K_2$=0).

In preferred embodiments, most CRCs are calculated on t-bit data (because most CRCs are computed on the output of a previous CRC), therefore I=t and the first formula is used. When I=t, the formula is simplified. One simply has to XOR the data with $IV_0$ XOR $IV_1$ before calling the CRC. In fact, since $IV_0=0$ in our case, one simply has to XOR the data with $IV_1$.

In case the reference value was provided by an entity (e.g. a certificate authority server) distinct from the entity performing the sensitive operation (e.g. a smart card), it may happen that the reference value has been computed with a CRC using a non-zero $IV_1$. The following method based on the above formulae can be used in order to check the integrity despite the fact that $IV_1$ is non-zero.

The received reference value (denoted R_CRC) is equal to $CRC(M,IV_1)$. $CRC(M,IV_1)$ cannot be used in the context of the invention because such CRC (with non zero IV) does not satisfy the mathematical properties needed for the invention. But the above formula can be used: $CRC(M, IV_1)=CRC(M$ XOR $K_1, IV_0)$ XOR $K_2$ (the names $IV_1$ and $IV_0$ have been swapped for legibility, which does not affect the formula as the names are purely conventional).

This formula can also be written:

$$CRC(M \text{ XOR } K_1, IV_0) = CRC(M, IV_1) \text{ XOR } K_2 = R\_CRC \text{ XOR } K_2$$

R_CRC XOR $K_2$ can be easily computed by the smart card. Instead of verifying the integrity of M, the smart card now has to verify the integrity of M XOR $K_1$. As seen in the above formulae, $K_1$ affects at most t bits of the message M, and t is typically small.

Although it has been shown that it is possible to handle a R_CRC computed with a non-zero IV, it is preferred to avoid such situations by using zero as an IV when computing the reference value.

Depending on the implementation, the polynomial g(x) reducing the expression in the CRC computation may be used in reverse representation (a.k.a little-endian representation). In this case, the final XOR ($IV_0$ XOR $IV_1$) is performed with reverse representation of $IV_0$ and $IV_1$.

For example, using an hexadecimal representation, let us consider M=0x5D and the CRC-16-CCITT with polynomial in normal representation (a.k.a big-endian representation) 0x1021. Let $IV_0$=0x064C, $IV_1$=0x1DCD and $IV_2=IV_0$ XOR $IV_1$=0x1B81.

$$CRC\text{-}16\text{-}CCITT(M, IV_0) = 0xA1D2.$$

However, if one is unable to compute CRC-16-CCITT with an IV equal to $IV_0$, but only able to compute it with an IV equal to $IV_1$, then:

$$CRC\text{-}16\text{-}CCITT(M, IV_0) = \begin{bmatrix} CRC\text{-}16\text{-}CCITT \\ ((0 \times 5D XOR 0 \times 1B), IV_1) \end{bmatrix}$$
$$XOR[0 \times 1B81]$$
$$XOR[0 \times 0081]$$
$$= 0 \times A1D2$$

In the rest of the description, it is assumed that the CRC has an initial value IV equal to zero since it has good mathematical properties. In particular padding the message with leading zero bits does not change the value of the CRC. This typically makes it useless to mention the expand function inside parameters of such CRC, even for clarity. It is possible to adapt CRCs with non-zero IV to CRC with IV equal to zero with the above technique. In the rest of the description, CRC(M) stands for the CRC of M computed with an initial value IV equal to zero.

By studying the mathematical properties of CRC, the applicant has designed a preferred method for computing a CRC in the context of the invention. The notations used above for mathematically defining a CRC are no longer used in the rest of the document (in particular, parameters n and k will have different meanings as explained below).

The method is based on the following formula, devised by the applicant, which is true for any CRC as mathematically defined above (with IV=zero):

$$CRC(m) = XOR_{i=0\ldots L-1, j=0\ldots N-1}(CRC(hi_{t,si}(r_{i,j}))$$
$$XOR((lo_{t,t-si}(r_{i,j})) \ll si))$$

where:
m is the message which CRC has to be computed;
m is converted into a message M consisting of N random parts $m_0 \ldots m_{N-1}$. N is preferably greater than or equal to 2. If N=1, then there is no random part, but simply the message in clear, denoted $m_0$. If N=1, the method works as well but leaks a lot more information as explained above. The random parts $m_j$ are such that $XOR_{j=0\ldots N-1}(m_j) = m_0$ XOR $m_1$ XOR $\ldots$ XOR $m_{N-1}=m$. For example, $m_1 \ldots m_{N-1}$ may be obtained from a random number generator, and $m_0$ may be equal to m XOR $m_1$ XOR $\ldots$ XOR $m_{N-1}$. In a preferred embodiment, each random part $m_j$ has the same length as the original message m. The size of the converted message M is therefore N times as big as the size of the original message m;
each random part $m_j$ is divided in L blocks $B_{L-1,j}$, $B_{L-2,j}, \ldots B_{0,j}$ such that $m_j = B_{L-1,j} \| B_{L-2,j} \| \ldots B_{0,j}$, the size of each block $B_{i,j}$ being preferably constant and equal to k, the operator $\|$ standing for concatenation. The blocks $B_{L-1,j}$ (for every j) are the most significant blocks of random parts $m_j$. We can consider that each block $B_{L-1,j}$, $j=0 \ldots N-1$ has a constant size k. Indeed, if the size of the message m in bits is not a multiple of k, $B_{L-1,j}$ has less than k bits, but it is possible to pad $B_{L-1,j}$ with leading zero bits (i.e. most significant bits equal to zero) in order that its size is k bits. Since the CRC has an initial value IV equal to zero, it can be shown that the CRC of the zero-padded block is equal to the CRC of the block before padding.
$r_{i,j}$ is equal to $CRC^{1+floor(i*k/t)}(B_{i,j})$, wherein floor(x) denotes the greatest integer lower than or equal to x, wherein $CRC^1(X)=CRC(X)$, and wherein $CRC^p(X)=CRC(CRC^{p-1}(X))$ for p>1;
si is equal to i*k mod t, i.e. the remainder of the division of i*k by t;
$hi_{t,z}(X)$ is defined for numbers X represented as at bit register. $hi_{t,z}(X)$ is equal to the number consisting of the z most significant bits of X. In other words, if the binary representation of X is $X_{t-1}, X_{t-2} \ldots X_0$ where each $X_i$ is a bit, $hi_{t,z}(X)$ is equal to the number which binary representation in at bit register is $0_{t-z-1}, 0_{t-z-2}, \ldots 0_0, X_{t-1}, X_{t-2}, \ldots X_{t-z}$;
$lo_{t,z}(X)$ is defined for numbers X represented as at bit register. $lo_{t,z}(X)$ is equal to the number consisting of the z least significant bits of X. In other words, if the binary representation of X is $X_{t-1}, X_{t-2} \ldots X_0$ where each $X_i$ is a bit, $lo_{t,z}(X)$ is equal to the number which binary representation in at bit register is $0_{t-1}, 0_{t-2}, 0_z, X_{z-1}, X_{z-2}, \ldots X_0$;
the operator $\ll$ is the shift left operator (on a t-bit number, but t is not indicated in order to simplify the notation). In other words, if the binary representation of X is $X_{t-1}, X_{t-2} \ldots X_0$, then the binary representation of $X \ll z$ is $X_{t-1-z}, X_{t-2-z}, \ldots X_0, 0_{z-1}, 0_{z-2}, \ldots 0_0$ A preferred method based on the above formula is represented on FIG. 1.

In this method all blocks $B_{i,j}$ are of equal size k. L denotes the number of blocks in each random part $m_j$, and t denotes the size of the output of the CRC in bits. n is an integer equal to 1+floor((L−1)*k/t), not to be confused with N, which is the number of random parts. The preliminary steps consisting in the conversion of the message into N random parts have been omitted for the sake of simplicity. A variable r is initialized with 0. The integrity check consists in:

a. randomly selecting one of the random parts $m_j$ and then randomly selecting one block $B_{i,j}$ of the randomly selected random part $m_j$, i being the position of the selected block in its random part, i being comprised between 0 and L−1. In the method depicted on FIG. 1, this random selection is achieved by using a permutation of [0 ... N*L−1] denoted sigma. As well known in the art, a permutation is a bijection from a finite set onto itself. The permutation sigma is typically randomly generated each time the method is called, but this step has been omitted here for the sake of simplicity.

b. recursively calculating the CRC of the selected block $B_{i,j}$ n times, and recording each intermediate CRC into a variable $r_p$, wherein $r_1$=CRC($B_{i,j}$) and $r_p$=CRC($r_{p-1}$) for p between 2 and n. While the calculation of $r_1$ involves a CRC on k bits, the calculation of all subsequent CRCs ($r_p$, p>1) involves CRCs conducted on the size of the output of the CRC (t bits).

c. selecting the $p^{th}$ intermediate CRC, stored in the variable $r_p$, wherein p is equal to 1+floor(i*k/t). This step seems strange, since it consists in discarding the values $r_{p+1}$ to $r_n$. One might wonder why those values $r_{p+1}$ to $r_n$ are calculated, since they are not used and therefore they seem to slow down the algorithm unnecessarily. In fact, the reason for computing those values is the balancing of the algorithm. Thanks to this balancing, each value $r_p$ is calculated in a constant time and an attacker cannot easily guess the index p with a timing attack. It is possible to optimize the speed of the algorithm by removing the unnecessary computations, but this is detrimental to security (the pros and cons should be weighted on a case by case basis).

d. calculating the CRC of the number consisting of the si most significant bits of $r_p$, wherein si is equal to i*k mod t, e. shifting left by si bits the number consisting of the t−si least significant bits of $r_p$, f. XORing the results of step d and e with r and storing the result in r, It should be noted that the order of steps d and e does not matter, and it is equivalent to do first e and then d. The XOR operation is associative and commutative therefore the order of the XORs in step f doesn't matter. It should also be noted that if k is a multiple of t, steps c and d are significantly simplified since si=0. In such case, step c and d can be omitted, and step e consists in XORing $r_p$ with r and storing the result in r.

The integrity check further consists in repeating steps a to f until all blocks of all random parts have been processed, each block being processed only once. In the example of FIG. 1, this is achieved by the counter I which loops through all N*L values between 0 and N*L−1, the counter being post-processed by the permutation sigma in order to randomly select a random part and to generate a random block index. The final value of the variable r contains the CRC of the data to be checked.

The calculation of the CRC of a message converted in N random parts divided in L blocks according to the above method is approximately N*L times slower than the calculation of the CRC of the message before conversion according to state of the art methods. However, given that a CRC is a fast operation, and it is even faster when it is hardware accelerated, the method does not have a significant impact on the performance of a regular sensitive operation such as an RSA signature.

This method can be improved in order to be adapted to a multitask environment. Indeed, a CRC engine (whether a software CRC engine or a hardware CRC engine when a CRC hardware accelerator is available), is not necessarily multitask. Typically, computing the CRC of data which is longer than the CRC register requires several accesses to the CRC engine, and each time the CRC engine is called, the state of the engine should be memorized in order that the subsequent call is properly handled. In a multi task environment, different routines might be willing to compute a CRC in parallel, in which case the results of the CRC are corrupted. Some CRC engines are designed to backup their contents for each calling application and restore them when the application calls them again, which solves the issue. However, not all hardware CRC engines allow the initialization of their register, therefore it is not always possible to have them support multitask environments.

For example, in some microcontrollers (e.g. SATURN chip of HP 48 SX calculator), a CRC engine is connected to the data bus of the processor, and in order to compute the CRC of some data, one simply has to set a pointer to the beginning of the memory containing the data, and read the data sequentially. Obviously, if there is an interrupt and if some interrupt routine starts reading data in memory (which any routine does), the data bus is fed with other data which corrupts the initial CRC computation.

With the above method, each call to the CRC module only involves data contained in one CRC register, and is independent of other CRC calls, with one potential exception. The potential exception is the calculation of $r_1$=CRC($B_{i,floor(sigma(I)/L)}$). Indeed the block has a length of k bits, which may be greater than the size t of the CRC register. t is normally equal to the size of the output of the CRC. The improvement consists either in using a block size k equal to t (when possible and compliant with the policy regarding the number of blocks), in which case no change is needed, or in replacing the instruction $r_1$=CRC($B_{i,floor(sigma(I)/L)}$) by:

$r_1 = 0$ for p=floor((k−1)/t) downto 0

$r_1$=CRC ($r_1$ XOR $lo_{k,t}(B_{i,floor(sigma(I)/L)} >> (p*t))$)

where the operator >> is the shift right operator. In other words, if the binary representation of X is $X_{v-1}, X_{v-2} \ldots X_0$, then the binary representation of X>>z is $0_{z-1}, 0_{z-2}, \ldots 0_0, X_{v-1}, X_{v-2}, \ldots X_z$.

The method may be implemented in a cryptographic device which has a CPU running the method. Obviously, if k and t are properly chosen, in particular if they are multiples of the size of the smallest element addressable by the CPU, i.e. typically a multiple of 8 bits in particular on simple microcontrollers, the use of the right shift operator can be replaced by a direct read operation in memory (the CPU can directly access the relevant sub block instead of computing shift operations on the whole block).

In preferred embodiments, the method can also be implemented in hardware (e.g. as part of a cryptoprocessor) in order to provide even faster performance, and may rely on an existing CRC hardware module or have its own dedicated CRC hardware.

In preferred embodiments, the sensitive operation protected by the above method is a cryptographic operation, such as a digital signature operation. This allows the signature to have a better resistance against in particular DPA and DFA attacks.

The data to be checked during the above cryptographic operation may consist of cryptographic keys, such as an RSA private key used for the computation of an RSA digital signature. Data to be check could also comprise other information, such as padding information (e.g. in order to prevent padding attacks in signature operations), etc. When data has to be signed, it has to have the length of the RSA modulus, therefore if it is shorter, it has to be padded. The padding should not be chosen arbitrarily as it can create weaknesses.

The invention also relates to a cryptographic device wherein at least one sensitive operation of the cryptographic device is protected by a method as described above. The method may be implemented in software, in hardware, or in a combination of software and hardware.

Smart cards are an example of preferred cryptographic device implementing the method. Many other devices are possible, in particular MMC type cards, SD type cards, USB tokens, or trusted modules designed to secure personal computers (such as TCPA TPM modules), high end microprocessors (such as those used for computers and servers) implementing cryptographic functions, portable devices (such as PDAs, cellular phones, laptop computers), etc.

The performance (in terms of speed of execution) is optimal when k and t are powers of 2. t is typically equal to $2^4$ or $2^5$ (i.e. 16 or 32).

With such k and t, remainders and integer divisions or multiplications are simplified by involving simple AND masks and shifts. With many cryptographic devices, it is advantageous to pass the t-bit data (which CRC computation is desired) to the CRC module without indirection (by directly passing the value). This is particularly efficient when the registers of the CPU are t-bit wide or can contain t-bit numbers.

The invention claimed is:

1. A method for protecting a sensitive operation by checking the integrity of at least a subset of the data manipulated by the sensitive operation, said subset of data being referred to as the data to be checked, comprising:
  computing, by a processor, an integrity check value from data to be checked by initializing a result integrity check value r for the data to be checked and converting the data to be checked into at least two random parts and computing an integrity check value on the random parts, by:
    dividing the random parts into a plurality of blocks;
    randomly selecting a block of the plurality of blocks;
    recursively computing an integrity check value on the selected block and saving a plurality of intermediate results from the recursive computation;
    selecting one intermediate result from the plurality of intermediate results;
    using the selected result to compute the integrity check value for the selected block; and
  comparing said integrity check value from data to be checked with a reference value, wherein data to be checked are divided into blocks, an intermediate integrity check value being computed for each block, the intermediate integrity check values being computed in random order.

2. The method according to claim 1, wherein computing the integrity check value is based on a CRC (Cyclic Redundancy Code).

3. The method according to claim 2, wherein all random parts are of equal size, and all blocks are of equal size, and wherein, L denoting the number of blocks in each random part, k denoting the size of each block in bits, t denoting the size of the output of the CRC in bits, floor(x) denoting the greatest integer lower than or equal to x, n being an integer equal to 1+floor((L−1)*k/t), and the variable r being initialized with 0, checking the integrity comprises:
  a. wherein the recursive computation of the integrity check value for the selected block comprises recursively calculating the CRC of the selected block $B_{i,j}$ n times, and recording each intermediate CRC,
  b. wherein the selecting one intermediate result for the selected block comprises selecting the $p^{th}$ intermediate CRC, denoted $r_p$, wherein p is equal to 1+floor(i*k/t),
  wherein using the selected result to compute the integrity check value for the selected block comprises:
  c. calculating the CRC of the number consisting of the si most significant bits of $r_p$, wherein si is equal to i*k mod t, and
  d. shifting left by si bits the number consisting of the t-si least significant bits of $r_p$,
  wherein the method further comprises:
  e. XORing the results of step c and d with r and storing the result in r, and repeating steps a to e until all blocks of all random parts have been processed, each block being processed only once, the final value of the variable r containing the CRC of the data to be checked.

4. The method according any of the previous claims, wherein the sensitive operation is a cryptographic operation.

5. The method according to claim 4, wherein the data to be checked comprise a cryptographic key.

6. A cryptographic device operable to perform at least one sensitive operation, wherein the cryptographic device protects at least one sensitive operation by checking the integrity of at least a subset of the data manipulated by the sensitive operation, said subset of data being referred to as the data to be checked, the cryptographic device comprises means for checking the integrity by
  computing, by a computing means, an integrity check value from data to be checked by initializing a result integrity check value r for the data to be checked and converting the data to be checked into at least two random parts and computing an integrity check value on the random parts, by:
    dividing the random parts into a plurality of blocks;
    randomly selecting a block;
    recursively computing an integrity check value on the selected block and saving a plurality of intermediate results from the recursive computation;
    selecting one intermediate result from the plurality of intermediate results;
    using the selected result to compute the integrity check value for the selected block; and
  comparing, by a comparing means, said integrity check value from data to be checked with a reference value, wherein the method further comprises that data to be checked are divided into blocks, an intermediate integrity check value being computed for each block, the intermediate integrity check values being computed in random order.

7. The cryptographic device according to claim 6, wherein the cryptographic device is a smart card.

8. The cryptographic device of claim 6 wherein computing the integrity check value is based on a CRC.

9. The cryptographic device of claim 8 wherein all random parts are of equal size, and all blocks are of equal size, and wherein, L denoting the number of blocks in each random part, k denoting the size of each block in bits, t denoting the size of the output of the CRC in bits, floor(x) denoting the greatest integer lower than or equal to x, n being an integer equal to 1+floor((L−1)*k/t), and a variable r being initialized with 0, checking the integrity comprises:
   a. wherein the recursive computation of the integrity check value for the selected block comprises recursively calculating the CRC of the selected block $B_{i,j}$ n times, and recording each intermediate CRC,
   b. wherein the selecting one intermediate result for the selected block comprises selecting the $p^{th}$ intermediate CRC, denoted $r_p$, wherein p is equal to 1+floor(i*k/t),
   wherein using the selected result to compute the integrity check value for the selected block comprises:
   c. calculating the CRC of the number consisting of the si most significant bits of $r_2$, wherein si is equal to i*k mod t; and
   d. shifting left by si bits the number consisting of the t-si least significant bits of $r_a$,
   wherein the method further comprises:
   e. XORing the results of step c and d with r and storing the result in r,
   and repeating steps a to e until all blocks of all random parts have been processed, each block being processed only once, the final value of the variable r containing the CRC of the data to be checked.

10. The cryptographic device according to any of claim 6, 7, 8 or 9 wherein the sensitive operation is a cryptographic operation.

11. The cryptographic device of claim 10 wherein the data to be checked comprise a cryptographic key.

* * * * *